United States Patent
Sakai et al.

(10) Patent No.: US 11,484,934 B2
(45) Date of Patent: Nov. 1, 2022

(54) MANUFACTURING METHOD OF CASING

(71) Applicant: MITSUBISHI HEAVY INDUSTRIES COMPRESSOR CORPORATION, Tokyo (JP)

(72) Inventors: Yasunori Sakai, Hiroshima (JP); Toshiyuki Yamamori, Hiroshima (JP); Makio Morimoto, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 9 days.

(21) Appl. No.: 17/180,319

(22) Filed: Feb. 19, 2021

(65) Prior Publication Data

US 2021/0260646 A1    Aug. 26, 2021

(30) Foreign Application Priority Data

Feb. 25, 2020    (JP) .............................. JP2020-029538

(51) Int. Cl.
*B23P 15/00* (2006.01)
*B21K 1/26* (2006.01)
(Continued)

(52) U.S. Cl.
CPC ............... *B21K 1/26* (2013.01); *B21J 5/002* (2013.01); *B21J 5/12* (2013.01); *B23P 15/00* (2013.01);
(Continued)

(58) Field of Classification Search
CPC ............................. Y10T 29/4932; B23P 15/00
See application file for complete search history.

(56) References Cited

U.S. PATENT DOCUMENTS 3,712,272 A * 1/1973 Carnavos ............... F22B 37/266
                                                            165/157
4,143,619 A * 3/1979 Marjollet .............. F22B 37/266
                                                            165/110
(Continued)

FOREIGN PATENT DOCUMENTS

EP        2158996 A1    3/2010
EP        3561242 A1    10/2019
(Continued)

OTHER PUBLICATIONS

English Machine Translation of JPS58133405(A), Gotou Michihiro et al., Aug. 9, 1983 (Year: 1983).*

*Primary Examiner* — Sarang Afzali
(74) *Attorney, Agent, or Firm* — Osha Bergman Watanabe & Burton LLP

(57) ABSTRACT

A manufacturing method of a casing, the manufacturing method includes a step of manufacturing a plurality of metal members which are components constituting the casing including a casing body having a tubular shape that extends with an axis as a center; a step of arranging the plurality of metal members according to the casing to be formed; and a step of forming the casing by welding the plurality of metal members to each other, in which in the step of manufacturing the metal members, the plurality of metal members are manufactured by at least two kinds of manufacturing methods among forging, steel plate processing, casting, and a fused metal deposition method.

6 Claims, 9 Drawing Sheets

(51) Int. Cl.
  *B33Y 80/00* (2015.01)
  *B21J 5/00* (2006.01)
  *B21J 5/12* (2006.01)

(52) U.S. Cl.
  CPC ........ *B33Y 80/00* (2014.12); *F05D 2230/232* (2013.01); *Y10T 29/4932* (2015.01)

(56) References Cited

U.S. PATENT DOCUMENTS

2015/0107223 A1* 4/2015 Mountz ................. F01D 25/005
            60/226.3
2019/0242271 A1    8/2019 Bovyn et al.
2020/0331063 A1* 10/2020 Nass ....................... B22F 5/009

FOREIGN PATENT DOCUMENTS

JP      S58133405  A    8/1983
WO    2013-188722  A1  12/2013

* cited by examiner

MANUFACTURING METHOD OF CASING

BACKGROUND OF THE INVENTION

Field of the Invention

The present disclosure relates to a manufacturing method of a casing.

Priority is claimed on Japanese Patent Application No. 2020-029538, filed on Feb. 25, 2020, the content of which is incorporated herein by reference.

Description of Related Art

In a rotating machine such as a steam turbine, a gas turbine, and a centrifugal compressor, a casing in which a rotor is housed has generally a structure formed by casting. The casing can be vertically divided into an upper half casing and a lower half casing. Each of the upper half casing and the lower half casing is integrally formed by casting. However, it is necessary to prepare a mold in a case of forming a casing by casting. It takes a lot of time to make a large mold for forming a large metal member such as a casing.

Japanese Unexamined Patent Application, First Publication No. S58-133405 discloses a configuration in which a casing is divided into a plurality of block materials, and the separately manufactured block materials are welded to each other. Thereby, it is possible to reduce the size of the mold for forming each block material.

SUMMARY OF THE INVENTION

However, even in the configuration disclosed in Japanese Unexamined Patent Application, First Publication No. S58-133405, it is still necessary to prepare a mold. Therefore, it takes time to manufacture a mold and to actually manufacture a metal member after the design of the metal member is completed. As a result, it takes a long period of time from the design of the casing to the completion of the manufacturing.

The present disclosure provides a manufacturing method of a casing which can shorten a period of time for the manufacturing.

A manufacturing method of a casing according to an aspect of the present disclosure includes a step of manufacturing a plurality of metal members which constitute the casing including a casing body having a tubular shape that extends around an axis; a step of arranging the plurality of metal members according to a shape of the casing to be formed; and a step of forming the casing by welding the plurality of metal members to each other, in which in the step of manufacturing the metal members, the plurality of metal members are manufactured by at least two kinds of manufacturing methods among forging, steel plate processing, casting, and a fused metal deposition method.

According to the manufacturing method of the casing of the present disclosure, it is possible to shorten the period of time for manufacturing a casing.

DETAILED DESCRIPTION OF THE INVENTION

First Embodiment

Hereinafter, a mode for implementing a manufacturing method of a casing according to the present disclosure will be described with reference to the accompanying drawings. However, the present disclosure is not limited to the embodiment only.

Configuration of Steam Turbine

Figure 1:
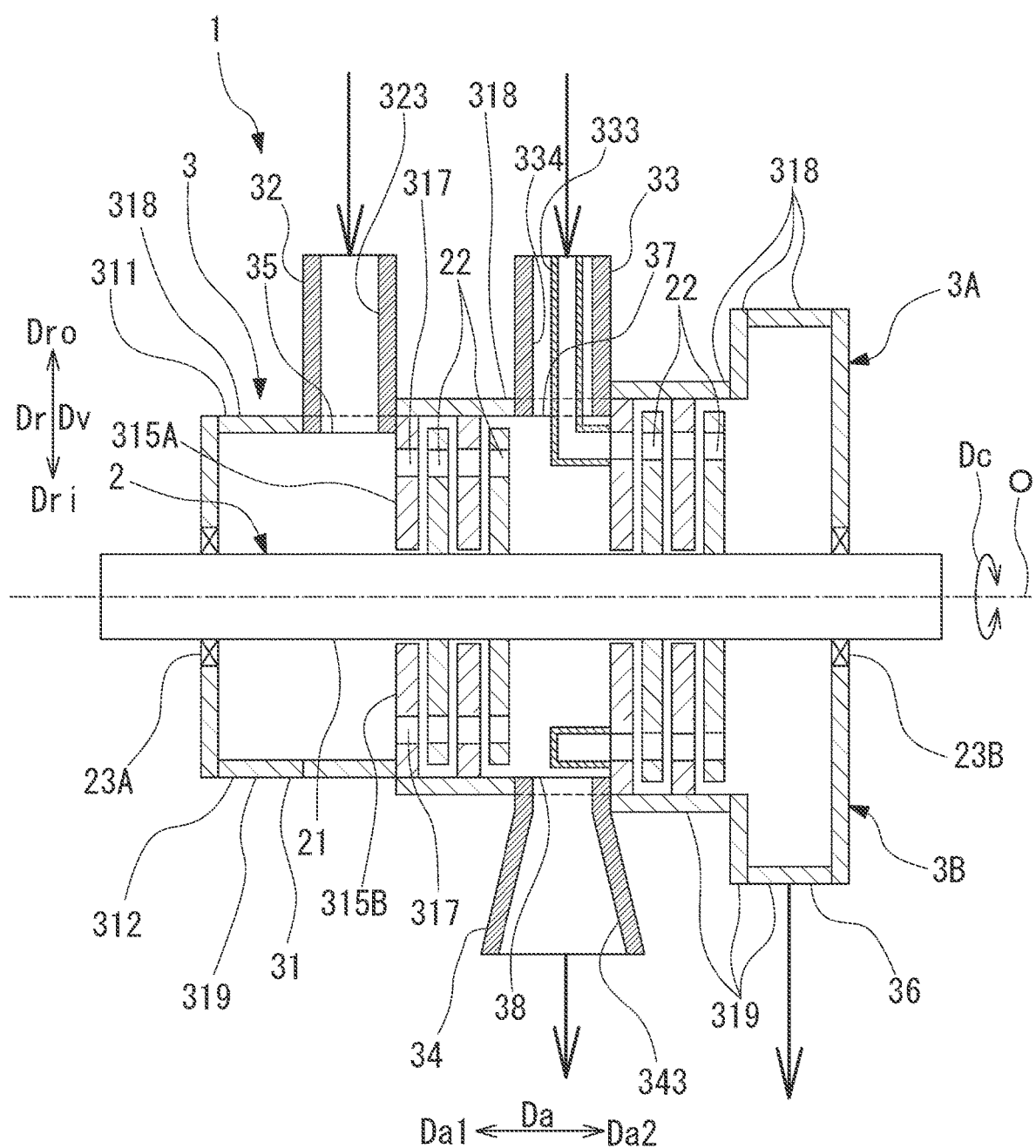
FIG. 1 is a diagram illustrating a schematic configuration of a steam turbine including a casing manufactured by using a manufacturing method of a casing according to an embodiment.

In the embodiment, a casing 3 is applied to a steam turbine 1. As illustrated in FIG. 1, the steam turbine 1 includes a rotor 2, and the casing 3.

The rotor 2 includes a rotating shaft 21 and rotor blades 22. The rotating shaft 21 is formed in a columnar shape extending in an axial direction Da with an axis O as the center. Both end portions of the rotating shaft 21 are supported by a first bearing 23A and a second bearing 23B so as to be rotatable around the axis O. The first bearing 23A and the second bearing 23B are fixed to the casing 3. The rotor blades 22 are arranged to constitute a plurality of stages at intervals in the axial direction Da. Each of the rotor blades 22 is fixed to the outer circumferential surface of the rotating shaft 21 so as to extend to an outer side Dro in a radial direction Dr.

In the following, a direction in which the axis O extends is referred to as the axial direction Da. The radial direction with respect to the axis O is simply referred to as the radial direction Dr. An up-down direction of the paper of FIG. 1, which is a part of the radial direction Dr is referred to as a vertical direction Dv. A direction which is part of the radial direction Dr and is orthogonal to the vertical direction Dv is referred to as a horizontal direction Dh (refer to FIG. 2) that is a width direction of the steam turbine 1. A direction around the rotor 2 with the axis O as the center is referred to as a circumferential direction Dc. Further, a first side Da1 of the axial direction Da is an upstream side in a flow direction of steam flowing inside the casing 3. A second side Da2 of the axial direction Da is a downstream side in the flow direction of the steam flowing inside the casing 3.

Configuration of Casing

The casing 3 is arranged to cover the rotor 2. The casing 3 can be divided into an upper half casing 3A and a lower half casing 3B with a horizontal plane including the axis O as a reference. As illustrated in FIG. 1, upper half diaphragms 315A having a semicircular shape viewed from the axial direction Da are fixed on an inner side Dri of the upper half casing 3A in the radial direction Dr. Lower half diaphragms 315B having a semicircular shape viewed from the axial direction Da are fixed on the inner side Dri of the lower half casing 3B in the radial direction Dr. The upper half diaphragms 315A and the lower half diaphragms 315B are arranged on the first side Da1 of the rotor blades 22 of each stage in the axial direction Da. In the upper half diaphragm 315A and the lower half diaphragm 315B, a plurality of stator vanes 317 which are lined up in the circumferential direction Dc are arranged at a position on the first side Da1 of the rotor blades 22 in the axial direction Da. The casing 3 of the embodiment includes a casing body 31, an inlet valve chamber 32, an extraction pressure control valve chamber 33, and an extraction port 34.

The casing body 31 is formed in a tubular shape extending in the axial direction Da. The casing body 31 covers the rotor 2 from the outer side in the radial direction Dr. In the casing body 31, a steam inlet 35, a steam outlet 36, a steam intermediate inlet 37, a steam intermediate outlet 38 are formed.

The steam inlet 35 is formed on the first side Da1 of the center of the casing body 31 in the axial direction Da. The steam inlet 35 is a through-hole communicating with the inside and outside of the casing body 31. The steam intermediate inlet 37 is formed between the steam inlet 35 and the steam outlet 36 in the axial direction Da. The steam intermediate inlet 37 is a through-hole communicating with the inside and outside of the casing body 31. Through the steam inlet 35 and the steam intermediate inlet 37, steam (fluid) from the outside of the casing body 31 is introduced into the inside of the casing body 31.

The steam outlet 36 is arranged on the second side Da2 of the center of the casing body 31 in the axial direction Da. The steam outlet 36 is a through-hole communicating with the inside and outside of the casing body 31. The steam intermediate outlet 38 is formed between the steam inlet 35 and the steam outlet 36 in the axial direction Da. The steam intermediate outlet 38 is formed at a position that is substantially the same as the steam intermediate inlet 37 in the axial direction Da and is on a side opposite to the steam intermediate inlet 37 in the circumferential direction Dc. The steam intermediate outlet 38 is a through-hole communicating with the inside and outside of the casing body 31. Through the steam outlet 36 and the steam intermediate outlet 38, the steam that has flowed inside the casing body 31 is discharged to the outside.

Figure 2:
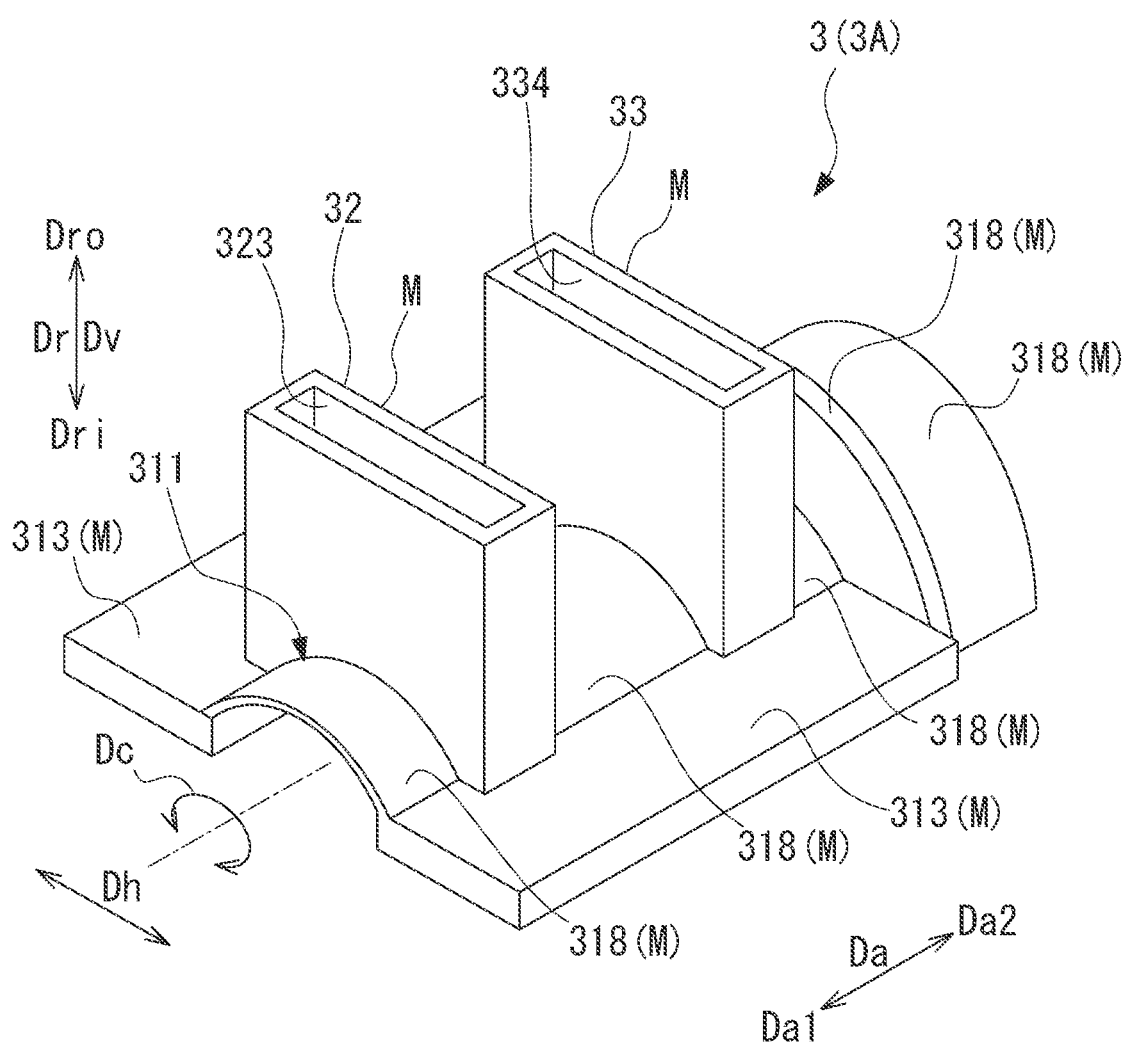
FIG. 2 is a perspective view illustrating an upper half part of the casing.

The casing body 31 includes an upper half body 311, and a lower half body 312. The upper half body 311 is arranged on the upper side in the vertical direction Dv with the axis O as a reference. As illustrated in FIG. 2, the upper half body 311 is formed in a semi-tubular shape so as to have a semicircular cross section which is open downward when viewed from the axial direction Da. An upper flange (flange) 313 extending in the horizontal direction Dh is formed at each of both ends of the upper half body 311 in the circumferential direction Dc. In the embodiment, the upper half body 311 is formed by welding the upper flanges 313 and a plurality of upper body block portions (body block portions) 318 in the axial direction Da.

Figure 3:
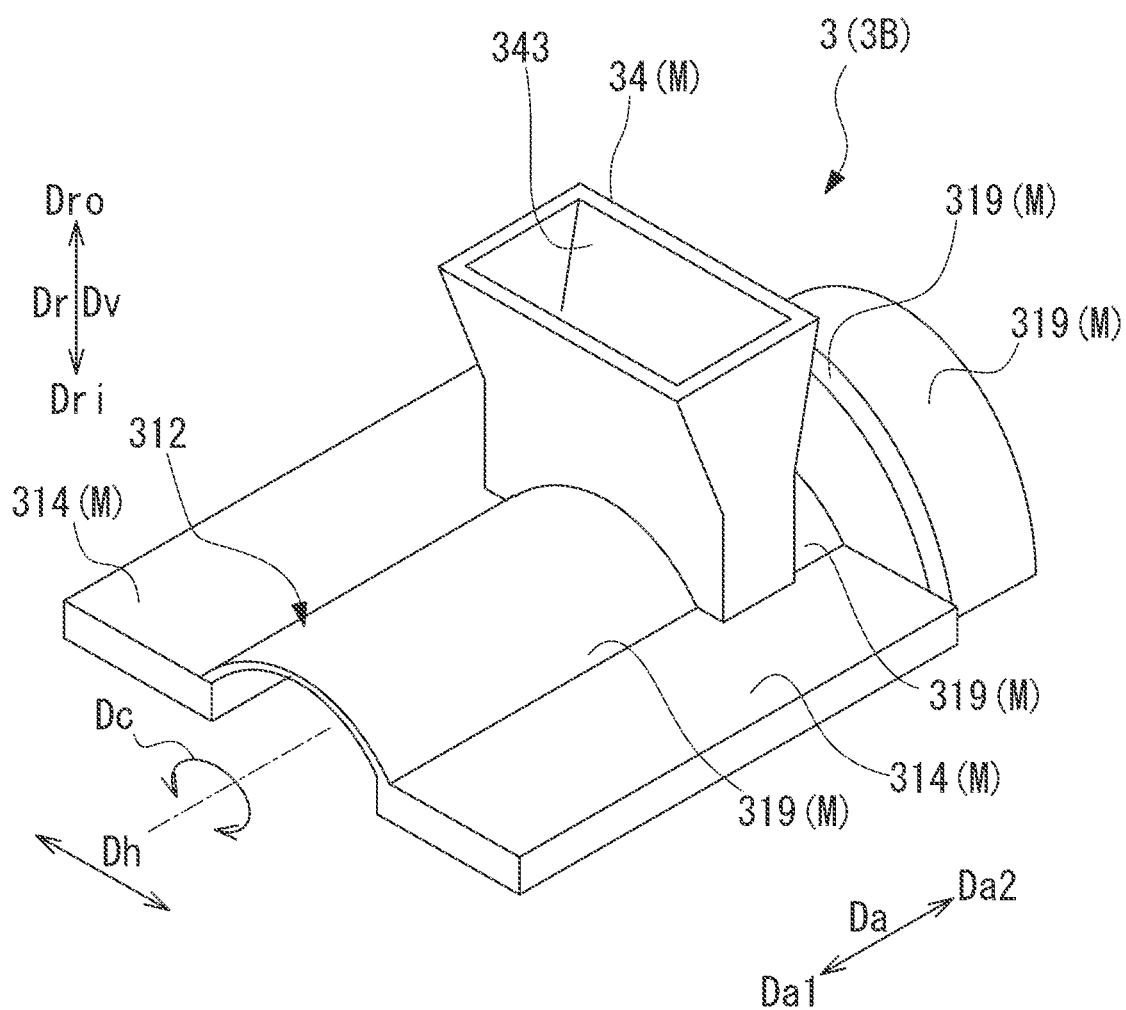
FIG. 3 is a perspective view of a lower half part of the casing viewed upside down in a vertical direction.

As illustrated in FIG. 1, the lower half body 312 is arranged on the lower side in the vertical direction Dv with the axis O as a reference. As illustrated in FIG. 3, the lower half body 312 is formed in a semi-tubular shape so as to have a circular cross section which is open upward when viewed from the axial direction Da. A lower flange (flange) 314 extending in the horizontal direction Dh is formed at each of both ends of the lower half body 312 in the circumferential direction Dc. In the embodiment, the lower half body 312 is formed by welding the lower flanges 314 and a plurality of lower body block portions (body block portions) 319 in the axial direction Da.

The upper half body 311 and the lower half body 312 constitute the casing body 31 by being connected to each other using connection means such as a bolt in a state where the upper flanges 313 and the lower flanges 314 abut each other in the vertical direction Dv.

The inlet valve chamber 32 is arranged to be connected to the steam inlet 35 of the casing body 31. The inlet valve chamber 32 can control the pressure and flow rate of the steam that flows into the casing body 31 from the steam inlet 35. Specifically, a pressure control valve and a main stop valve are arranged in the inlet valve chamber 32. In the inlet valve chamber 32, the pressure control valve and the main stop valve may be integrated. The inlet valve chamber 32 is a tubular member that is arranged to protrude to the outer side Dro in the radial direction Dr from the casing body 31. The inlet valve chamber 32 is formed in a rectangular tubular shape extending upward in the vertical direction Dv from the casing body 31. The inlet valve chamber 32 extends upward in the vertical direction Dv from an upper portion of the upper half body 311 in the vertical direction Dv. An inlet flow path portion (flow path portion) 323 that communicates with the inside of the casing body 31 is formed in the inlet valve chamber 32.

The extraction pressure control valve chamber 33 is arranged to be connected to the inside of the casing body 31, at an intermediate portion of the casing body 31 in the axial direction Da. The extraction pressure control valve chamber 33 controls the pressure of the steam which is extracted from the outside and flows into the inside of the casing body 31. The extraction pressure control valve chamber 33 is a tubular member that is arranged to protrude to the outer side Dro in the radial direction Dr from the casing body 31. The extraction pressure control valve chamber 33 is formed in a rectangular tubular shape extending upward in the vertical direction Dv from the upper portion of the upper half body 311. An extraction pressure control flow path portion (flow path portion) 334 that communicates with the inside of the casing body 31 is formed in the extraction pressure control valve chamber 33.

In addition, the casing 3 has an inner nozzle 333 that sends the extracted steam to the stator vanes 317 inside the casing body 31. The inner nozzle 333 is arranged in the extraction pressure control flow path portion 334. The inner nozzle 333 is provided separately from the extraction pressure control valve chamber 33. The inner nozzle 333 is connected to supply the steam to the stator vanes 317 which are positioned on the second side Da2 of the extraction pressure control valve chamber 33 in the axial direction Da.

The extraction port 34 is arranged to be connected to the inside of the casing body 31, at the intermediate portion of the casing body 31 in the axial direction Da. Through the extraction port 34, the steam in the casing body 31 is extracted to the outside. The extraction port 34 is a tubular member that is arranged to protrude to the outer side Dro in the radial direction Dr from the casing body 31. The extraction port 34 is formed in a tubular shape extending downward in the vertical direction Dv from the lower portion of the lower half body 312. The extraction port 34 of the embodiment is formed such that the position thereof in the axial direction Da overlaps the position of the extraction pressure control valve chamber 33. An extraction flow path portion (flow path portion) 343 that communicates with the inside of the casing body 31 is formed in the extraction port 34.

The upper half body 311, the inlet valve chamber 32, the extraction pressure control valve chamber 33 as described above are integrated by being welded to each other at the manufacturing stage, to form the upper half casing 3A. Further, the lower half body 312 and the extraction port 34 are integrated by being welded to each other at the manufacturing stage, to form the lower half casing 3B.

Procedure of Manufacturing Method of Casing

Figure 4:
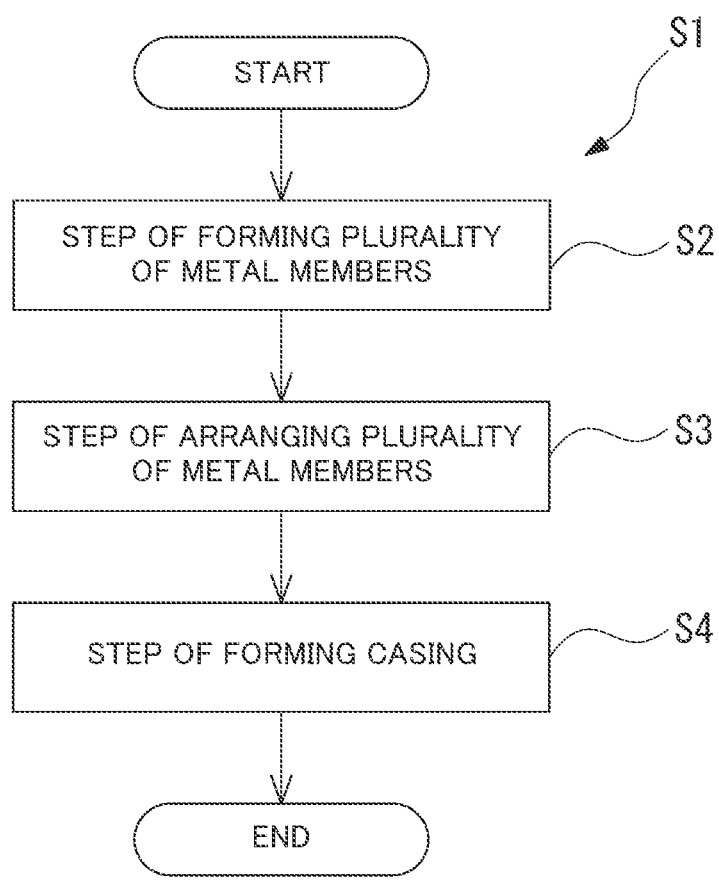
FIG. 4 is a flowchart illustrating a procedure of the manufacturing method of the casing according to the embodiment.

As illustrated in FIG. 4, a manufacturing method S1 of the casing 3 has a step S2 of forming a plurality of metal members M, a step S3 of arranging the plurality of metal members M, and a step S4 of forming the casing 3.

Step of Forming Plurality of Metal Members

Figure 5:
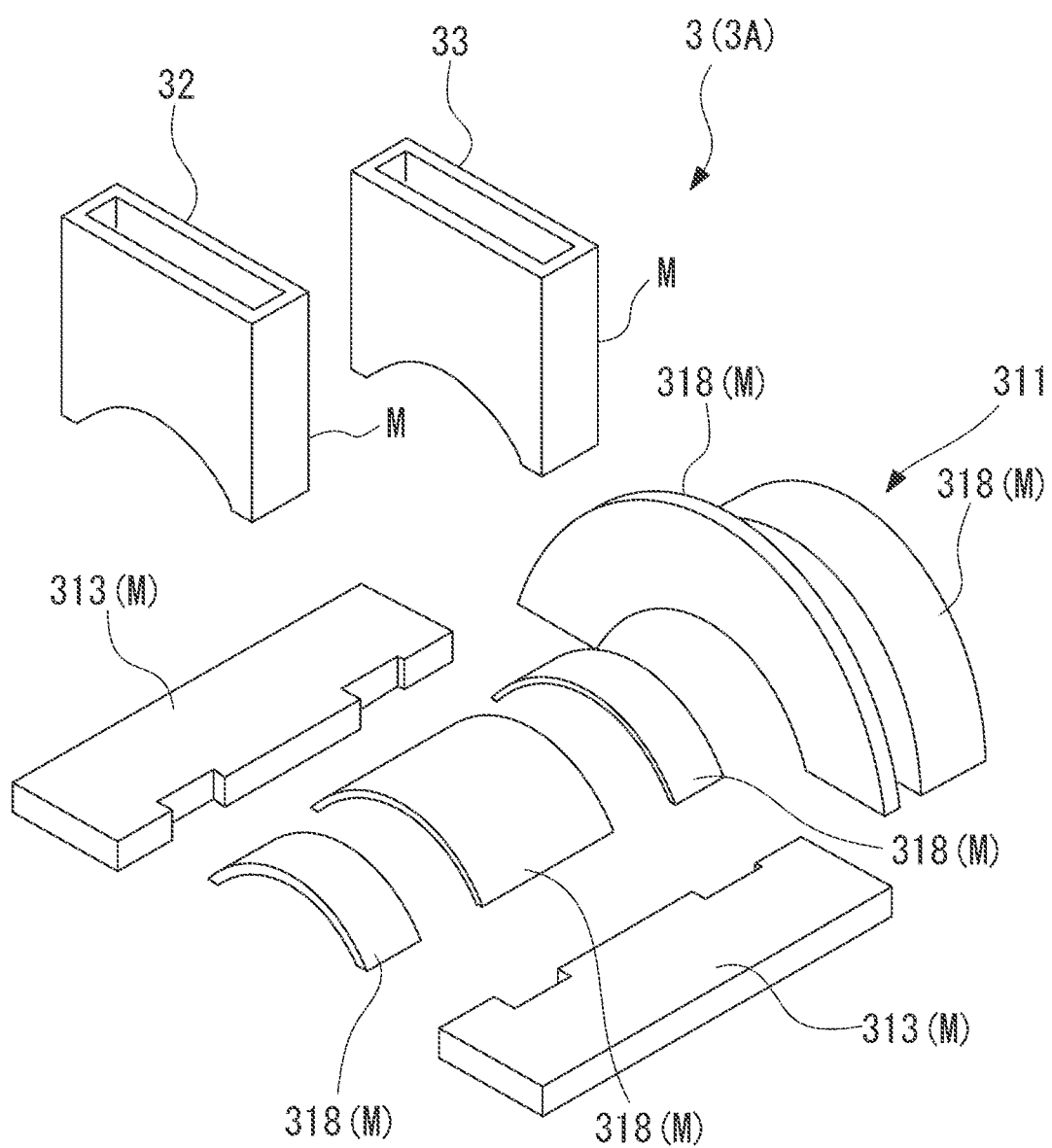
FIG. 5 is a perspective development view illustrating a plurality of metal components constituting the upper half part of the casing.

In step S2 of forming the plurality of metal members M, the plurality of metal members M as components constituting the casing 3 are formed. In the embodiment, as illustrated in FIGS. 2, 3, and 5, the plurality of metal members M are the plurality upper body block portions 318 and the upper flanges 313 which constitute the upper half body 311, the plurality of lower body block portions 319 and the lower flanges 314 which constitute the lower half body 312, the inlet valve chamber 32, the extraction pressure control valve chamber 33, and the extraction port 34. In step S2 of forming the metal members M, these metal members M are manufactured by at least two kinds of manufacturing methods among forging, steel plate processing, casting, and a fused metal deposition method. That is, not all metal members M are manufactured by one kind of manufacturing method such as casting, and in step S2 of forming the metal members M, at least one metal member M is manufactured by the fused metal deposition method.

In the embodiment, the upper body block portion 318 and the lower body block portion 319 are formed by forging or steel plate processing. In the forming by forging, for example, the upper body block portion 318 and the lower body block portion 319 which have a semicircular cross section are formed by vertically dividing a material, which is formed in an annular shape by forging, into two parts. In the forming by steel plate processing, for example, the upper body block portion 318 and the lower body block portion 319 are formed by bending a flat steel plate into a semicircular cross section by bending processing using a roller or the like, or by punching a member having a semicircular cross section by pressing processing.

In addition, the upper flange 313 and the lower flange 314 are formed by forging or steel plate processing. In the forming by forging or steel plate processing, the upper flange 313 and the lower flange 314 which have a predetermined shape are formed by performing cutting using cutting means such as gas cutting or mechanical cutting processing on a metal material larger than the upper flange 313 and the lower flange 314. As another forming method by forging, a block-shaped metal material, which is smaller than the upper flange 313 and the lower flange 314 and has a simple shape such as a square, is first manufactured by forging. Then, the upper flange 313 and the lower flange 314 having a predetermined shape are formed by welding the small block-shaped metal materials.

In the steam turbine 1, the steam having the highest pressure flows through the inlet valve chamber 32. Therefore, the inlet valve chamber 32 is formed as the thickest member in the casing 3 by the fused metal deposition method or casting so as to withstand the high-pressure steam. In the forming by the fused metal deposition method, for example, the inlet valve chamber 32 having a predetermined shape is formed by depositing fused metal on a steel plate or forged material as a base. In addition, depending on the shape of the inlet valve chamber 32, the members separately formed by the fused metal deposition method may be integrally formed by welding.

The extraction pressure control valve chamber 33 is formed by the fused metal deposition method or steel plate processing. In the forming by the fused metal deposition method, for example, the extraction pressure control valve chamber 33 having a predetermined shape is formed by depositing fused metal on a steel plate or forged material as a base. Further, in the forming by the steel plate processing, the extraction pressure control valve chamber 33 having a predetermined shape is formed by welding a plate member formed by the steel plate or forging. The inner nozzle 333, which is separately manufactured, is arranged inside the extraction pressure control valve chamber 33. The inner nozzle 333 can be formed by the steel plate processing, forging or fused metal deposition method.

The extraction port 34 is formed by the fused metal deposition method or steel plate processing. In the forming by the fused metal deposition method, for example, the extraction port 34 having a predetermined shape is formed by depositing fused metal on a steel plate or forged material as a base. Further, in the forming by the steel plate processing, the extraction port 34 having a predetermined shape is formed by welding a plate member formed by the steel plate or forging.

Step of Arranging Plurality of Metal Members

In step S3 of arranging the plurality of metal members M, the plurality of metal members M are arranged according to a shape of the casing 3 to be formed. That is, the plurality of upper body block portions 318 and the upper flanges 313 which constitute the upper half body 311 of the casing 3, the inlet valve chamber 32, the extraction pressure control valve chamber 33 are arranged to abut each other. Further, the plurality of lower body block portions 319 and the lower flanges 314 which constitute the lower half body 312, and the extraction port 34 are arranged to abut each other.

Step of Forming Casing

In step S4 of forming the casing 3, the casing 3 is formed by welding the plurality of metal members M to each other. That is, the upper body block portions 318, the upper flanges 313, the inlet valve chamber 32, and the extraction pressure control valve chamber 33 which abut each other are integrally joined by welding. Further, the plurality of lower body block portions 319 and the lower flanges 314 which constitute the lower half body 312, and the extraction port 34, which abut each other, are integrally joined by welding.

In step S3 of arranging the plurality of metal members M and step S4 of forming the casing 3, arranging two metal members M, which are adjacent to each other, so as to abut each other and then welding both the metal members M may be repeatedly performed in sequence.

Description for Joining Tubular Member and Casing Body

In the embodiment, the inlet valve chamber 32, the extraction pressure control valve chamber 33, and the extraction port 34 which are tubular members are joined as follows.

Figure 6:
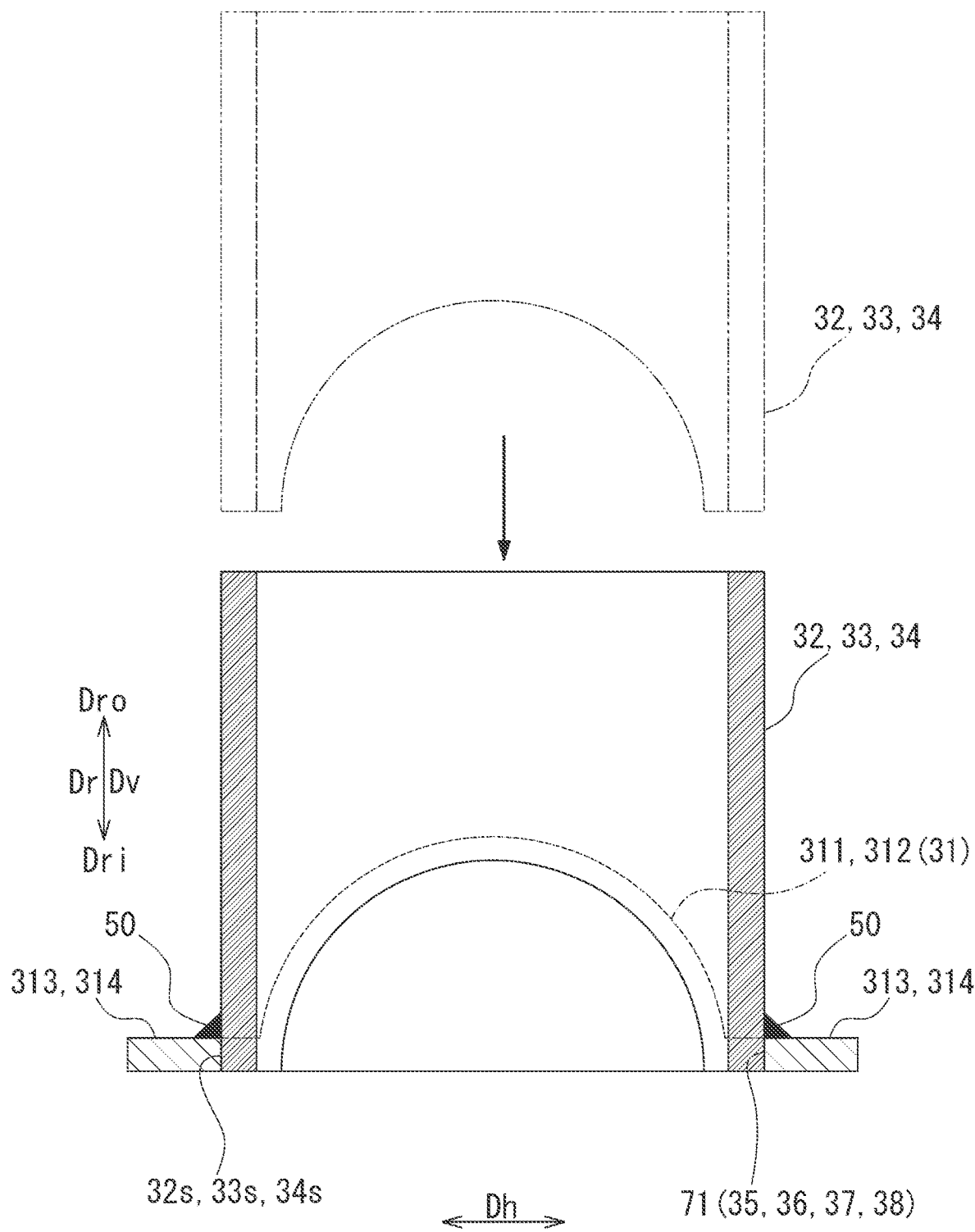
FIG. 6 is a sectional view illustrating an example of a joint structure of a tubular member and a casing body.

As illustrated in FIG. 6, the upper half body 311 and the lower half body 312 which constitute the casing body 31 has a communication opening 71 at a portion where each of the inlet valve chamber 32, the extraction pressure control valve chamber 33, and the extraction port 34 is joined. The communication opening 71 penetrates the casing body 31 in the radial direction Dr, and is open on the outer circumferential surface so as to communicate with the inside of the casing body 31. The communication openings 71 are formed such that end portions 32s, 33s, and 34s of the inlet valve chamber 32, the extraction pressure control valve chamber 33, and the extraction port 34 on the inner side Dri in the radial direction Dr can be inserted. The communication openings 71 in the embodiment are the steam inlet 35, the steam outlet 36, the steam intermediate inlet 37, and the steam intermediate outlet 38. The end portions 32s, 33s, and 34s of the inlet valve chamber 32, the extraction pressure control valve chamber 33, and the extraction port 34 on the inner side Dri in the radial direction Dr are inserted into the communication openings 71, and the edge portion of the communication opening 71 and each of the inlet valve chamber 32, the extraction pressure control valve chamber 33, and the extraction port 34 are welded to form a welded portion 50.

More specifically, in step S3 of arranging the plurality of metal members M, the plurality of upper body block portions 318 and the upper flanges 313 are arranged to form the communication openings 71. Then, the inlet valve chamber 32 and the extraction pressure control valve chamber 33 are arranged in a state where the end portion 32s of the inlet valve chamber 32 and the end portion 33s of the extraction pressure control valve chamber 33 are inserted into the communication openings 71. Similarly, the plurality of lower body block portions 319 and the lower flanges 314 are arranged to form the communication opening 71. Then, the extraction port 34 is arranged in a state where the end portion 34s of the extraction port 34 is inserted into the communication opening 71. In a state where each of the components is arranged in this manner, in step S4 of forming the casing 3, the inlet valve chamber 32, the extraction pressure control valve chamber 33, and the extraction port 34 are welded to the casing body 31.

Effects

According to the manufacturing method S1 of the casing 3 as described above, the plurality of metal members M for constituting the casing 3 are manufactured by at least two kinds of manufacturing methods among the forging, steel plate processing, casting, and fused metal deposition method. Therefore, it is not necessary to manufacture the entire casing 3 by casting, thereby making it is possible to reduce the labor and cost of manufacturing the mold. Accordingly, the period of time required for manufacturing the metal members M is very short as compared with a case where the entire casing 3 is manufactured as one component by casting. As a result, the period of time required for manufacturing the casing 3 can be shortened. Further, it is also possible to use different metal materials depending on the parts of the casing 3. As a result, it is possible to reduce the cost of manufacturing the casing 3.

In addition, in step S2 of forming the metal members M, at least one metal member M is manufactured by the fused metal deposition method. Thereby, even a metal member M having a complicated shape can be efficiently manufactured without using the mold.

Further, the upper half body 311 and the lower half body 312 are manufactured by being divided into the plurality of upper body block portions 318 and the plurality of lower body block portions 319. As a result, each of the upper body block portions 318 and the lower body block portions 319 is downsized, and thereby is easily manufactured and handled. Further, it is also possible to use different metal materials depending on the parts of the casing body 31.

The upper flanges 313 and the lower flanges 314 are formed by steel plate processing or forging. Thereby, the upper flanges 313 and the lower flanges 314 for connecting the upper half body 311 and the lower half body 312 can be easily formed as separate members with a structure or material having a higher strength than the upper body block portions 318 and the lower body block portions 319.

In step S2 of forming the metal members M, the inlet valve chamber 32, the extraction pressure control valve chamber 33, and the extraction port 34 which are tubular members are formed by any one of the fused metal deposition method, casting, and steel plate processing. Thereby, the inlet valve chamber 32, the extraction pressure control valve chamber 33, and the extraction port 34 which may have a complicated shape as compared with the casing body 31 can be efficiently manufactured by the fused metal deposition method. Further, the inlet valve chamber 32 in which the temperature and pressure of the steam (fluid) flowing the inlet flow path portion 323 is high is manufactured by the fused metal deposition method or casting, so that the inlet valve chamber 32 can be manufactured to have high strength that can withstand the high temperature and pressure.

The end portion 32s of the inlet valve chamber 32, the end portion 33s of the extraction pressure control valve chamber 33, and the end portion 34s of the extraction port 34 are inserted into the communication openings 71 formed in the casing 3 and are welded, so that the inlet flow path portion 323, the extraction pressure control flow path portion 334, and the extraction flow path portion 343 communicate with the inside of the casing body 31 as they are. Thereby, the inlet valve chamber 32, the extraction pressure control valve chamber 33, and the extraction port 34 can be easily connected to the casing body 31. Further, there is no need to perform welding inside the casing body 31, the inside of the inlet valve chamber 32, the extraction pressure control valve chamber 33, or the extraction port 34. Therefore, since there is no welding line at the positions facing the inlet flow path portion 323, the extraction pressure control flow path portion 334, and the extraction flow path portion 343, the flow of the steam in the steam turbine 1 is not obstructed. As a result, it is possible to suppress the efficiency reduction of the steam turbine 1.

Modification Example of Embodiment

In the above-described embodiment, the inlet valve chamber 32, the extraction pressure control valve chamber 33, and the extraction port 34 are fixed to the casing body 31 by being welded in a state where the end portions thereof on the inner side Dri in the radial direction Dr are inserted into the communication openings 71, but the fixing method is not limited thereto.

Figure 7:
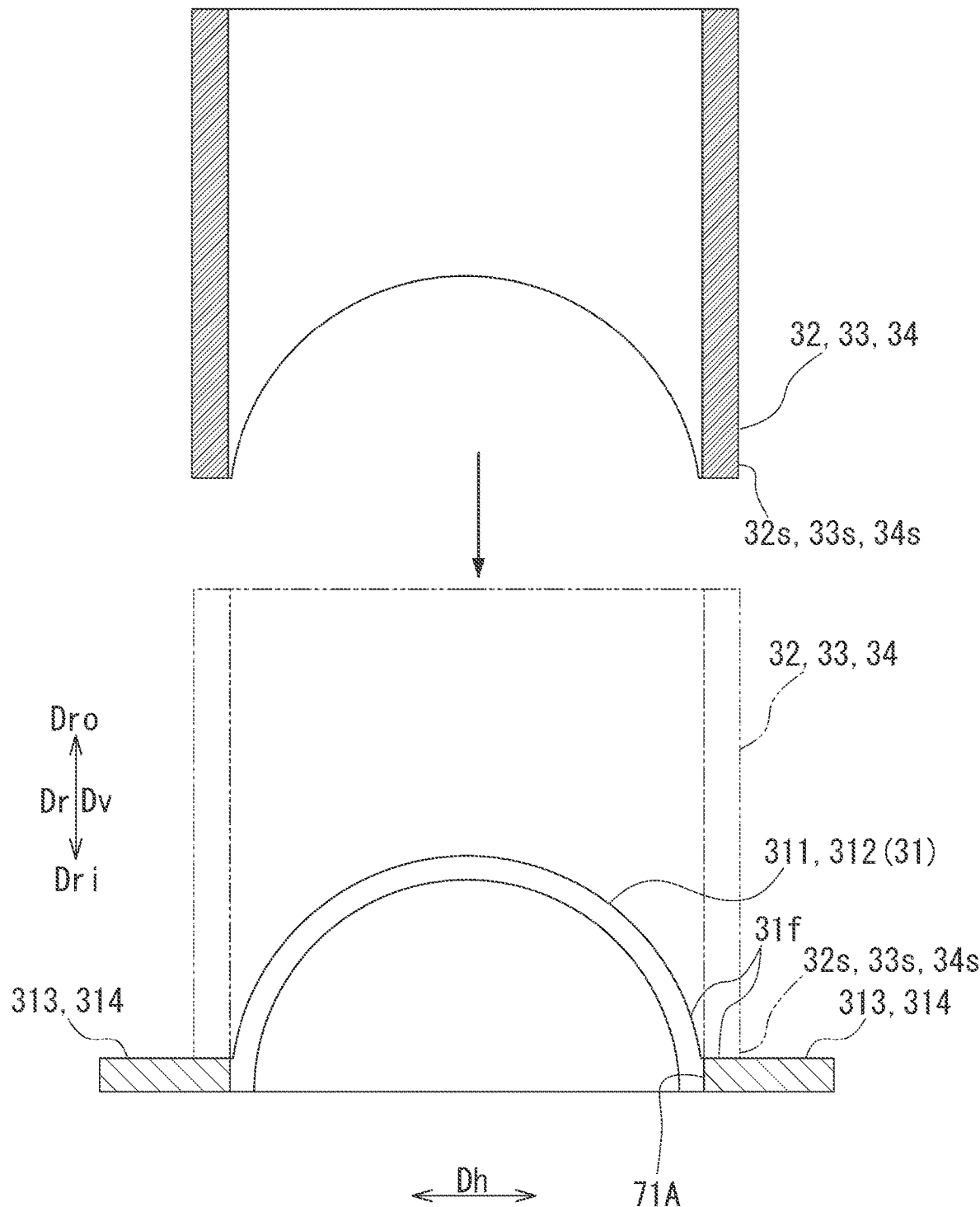
FIG. 7 is a sectional view illustrating another example of the joint structure of the tubular member and the casing body.

For example, as illustrated in FIG. 7, in the casing body 31 in the modification example, communication openings 71A may be formed in a size such that the end portion 32s of the inlet valve chamber 32, the end portion 33s of the extraction pressure control valve chamber 33, the end portion 34s of the extraction port 34 cannot be inserted. Such a casing 3 is formed by welding in a state where the end portion 32s of the inlet valve chamber 32, the end portion 33s of the extraction pressure control valve chamber 33, and the end portion 34s of the extraction port 34 are in contact with an outer circumferential surface 31f of the casing body 31.

Specifically, in step S3 of arranging the plurality of metal members M, the plurality of upper body block portions 318 and the upper flanges 313 are arranged to form the communication openings 71A. Then, the end surface of the end portion 32s of the inlet valve chamber 32, the end surface of the end portion 33s of the extraction pressure control valve chamber 33 are arranged in a state of being in contact with the outer circumferential surface 31f forming the edge portion of the communication opening 71A. Accordingly, the steam inlet 35 which is the communication opening 71A communicates with the inlet flow path portion 323. Further, the steam intermediate inlet 37 which is the communication opening 71A communicates with the extraction pressure control flow path portion 334. Similarly, the plurality of lower body block portions 319 and the lower flanges 314 are arranged to form the communication opening 71A. Then, the end surface of the end portion 34s of the extraction port 34 is arranged in a state of being in contact with the outer circumferential surface 31f forming the edge portion of the communication opening 71A. Accordingly, the steam intermediate outlet 38 which is the communication opening 71A communicates with the extraction flow path portion 343. In a state where each of the components is arranged in this manner, in step S4 of forming the casing 3, the end portion 32s of the inlet valve chamber 32, the end portion 33s of the extraction pressure control valve chamber 33, and the end portion 34s of the extraction port 34 are welded to the outer circumferential surface 31f of the casing body 31.

Thereby, the inlet valve chamber 32, the extraction pressure control valve chamber 33, and the extraction port 34 are arranged only in a region on the outer side Dro of the outer circumferential surface 31f of the casing body 31 in the radial direction Dr. That is, as compared with the structure in which the inlet valve chamber 32, the extraction pressure control valve chamber 33, and the extraction port 34 are inserted into the communication opening 71 as in the embodiment, the volumes of the inlet valve chamber 32, the extraction pressure control valve chamber 33, and the extraction port 34 are reduced. As a result, the time for manufacturing the inlet valve chamber 32, the extraction pressure control valve chamber 33, and the extraction port 34 is shortened, and thus the metal members M can be efficiently manufactured.

Figure 8:
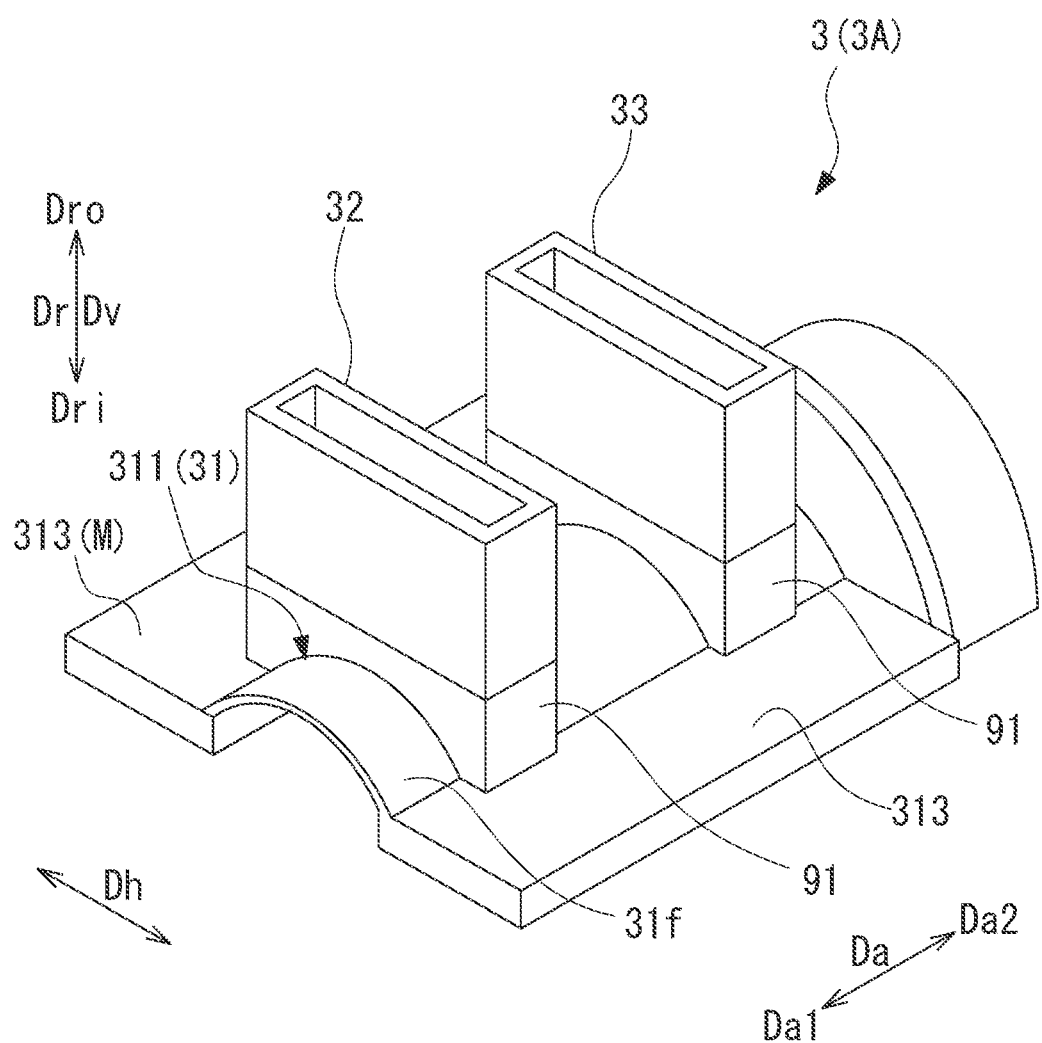
FIG. 8 is a perspective view illustrating still another example of the joint structure of the tubular member and the casing body.
Figure 9:
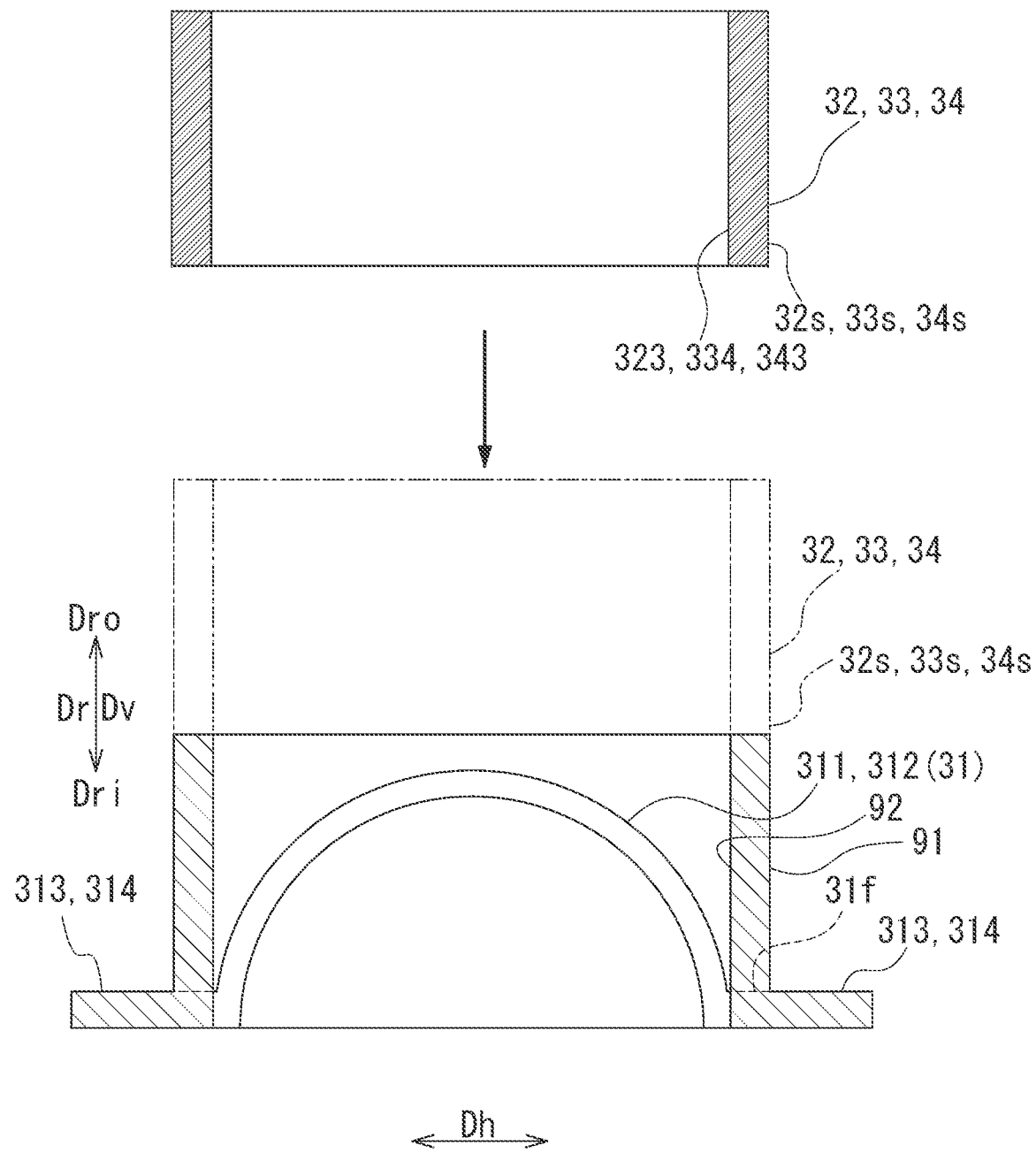
FIG. 9 is a sectional view illustrating still another example of the joint structure of the tubular member and the casing body.

As illustrated in FIGS. 8 and 9, the casing body 31 in another modification example may be formed by welding in a state where the end portion 32s of the inlet valve chamber 32, the end portion 33s of the extraction pressure control valve chamber 33, and the end portion 34s of the extraction port 34 are in contact with portions protruding from the outer circumferential surfaces 31f of the upper half body 311 and the lower half body 312.

Specifically, in the casing body 31 of the other modification example, casing-side tubular members 91 that protrude to the outer side Dro in the radial direction Dr are formed in the outer circumferential surfaces 31f of the upper half body 311 and the lower half body 312. A casing-side flow path portion 92 that communicates with the inside of the casing body 31 is formed in the casing-side tubular member 91.

In step S3 of arranging the plurality of metal members M, the end surface of the end portion 32s of the inlet valve chamber 32, and the end surface of the end portion 33s of the extraction pressure control valve chamber 33 are arranged in a state of being in contact with the end surfaces of distal end portions on the outer side Dro of the casing-side tubular members 91 in the radial direction Dr. Accordingly, the casing-side flow path portions 92 communicate with the inlet flow path portion 323 and the extraction pressure control flow path portion 334. Similarly, the end surface of the end portion 34s of the extraction port 34 is arranged in a state of being in contact with the end surface of a distal end portion on the outer side Dro of the casing-side tubular member 91 in the radial direction Dr. Accordingly, the casing-side flow path portion 92 communicates with the extraction flow path portion 343. In a state where each of the components is arranged in this manner, in step S4 of forming the casing 3, the end portion 32s of the inlet valve chamber 32, the end portion 33s of the extraction pressure control valve chamber 33, and the end portion 34s of the extraction port 34 are welded to the distal end portions of the casing-side tubular members 91.

Thereby, the inlet valve chamber 32, the extraction pressure control valve chamber 33, and the extraction port 34 are arranged only in a region further on the outer side Dro of the casing-side tubular member 91 that is positioned on the outer side Dro of the outer circumferential surface 31f of the casing body 31 in the radial direction Dr. That is, as compared with the structure in which the inlet valve chamber 32, the extraction pressure control valve chamber 33, and the extraction port 34 are inserted into the communication opening 71 as in the embodiment, the volumes of the inlet valve chamber 32, the extraction pressure control valve chamber 33, and the extraction port 34 are considerably reduced. As a result, the time for manufacturing the inlet valve chamber 32, the extraction pressure control valve chamber 33, and the extraction port 34 is significantly shortened, and thus the metal members M can be efficiently manufactured. The joint surfaces between the casing-side tubular members 91 and the inlet valve chamber 32, the extraction pressure control valve chamber 33, and the extraction port 34 can be made flat, and thus the joint surfaces can be easily formed.

Other Embodiments

The embodiment of the present disclosure has been described with reference to the drawings. But the specific configuration of the present disclosure is not limited to the embodiment, and includes design changes and the like within the scope of the gist of the present disclosure.

In the above-described embodiment, the steam turbine 1 has a structure including the extraction pressure control valve chamber 33 and the extraction port 34, but these configurations are not essential and can be omitted.

In the above-described embodiment, the plurality of upper body block portions 318 constituting the upper half body 311 and the plurality of lower body block portions 319 constituting the lower half body 312 are manufactured by forging or steel plate processing, but the present disclosure is not limited thereto. Each of the upper half body 311 and the lower half body 312 may be integrally molded by casting instead of the divided structure such as the upper body block portions 318 and the lower body block portions 319.

Further, the inner nozzle 333 and the extraction pressure control valve chamber 33 are not limited to being separate bodies. The inner nozzle 333 may be formed as one component integrated with the extraction pressure control valve chamber 33 by the fused metal deposition method.

Further, the casing 3 is not limited to the one applied to the steam turbine 1, and may be applied to other rotating machines such as a gas turbine and a compressor.

ADDITIONAL NOTES

The manufacturing method S1 of the casing 3 described in the embodiment is grasped as follows, for example.

(1) A manufacturing method S1 of a casing 3 includes a step S2 of manufacturing a plurality of metal members M which are components constituting the casing 3 including a casing body 31 having a tubular shape that extends around an axis O; a step S3 of arranging the plurality of metal members M according to a shape of the casing 3 to be formed; and a step S4 of forming the casing 3 by welding the plurality of metal members M to each other, in which in the step S2 of manufacturing the metal members M, the plurality of metal members M are manufactured by at least two kinds of manufacturing methods among forging, steel plate processing, casting, and a fused metal deposition method.

Examples of the casing 3 include casings 3 of the steam turbine 1, the gas turbine, and the compressor. Examples of the metal members M include the upper half body 311, the lower half body 312, the upper flanges 313, the lower flanges 314, the inlet valve chamber 32, the extraction pressure control valve chamber 33, and the extraction port 34.

Thereby, it is not necessary to manufacture the entire casing 3 by casting, and thus it is possible to reduce the labor and cost of manufacturing the mold. Accordingly, the period of time required for manufacturing the metal members M is very short as compared with a case where the entire casing 3 is manufactured as one component by casting. As a result, the period of time required for manufacturing the casing 3 can be shortened.

(2) A manufacturing method S1 of a casing 3 according to a second aspect is the manufacturing method S1 of the casing 3 in (1), in which in the step S2 of manufacturing the metal members M, at least one of the metal members M is manufactured by the fused metal deposition method.

Thereby, even the metal member M having a complicated shape can be efficiently manufactured without using the mold.

(3) A manufacturing method S1 of a casing 3 according to a third aspect is the manufacturing method S1 of the casing 3 in (1) or (2), in which the casing body 31 includes an upper half body 311 that is on an upper side of the casing body 31 in a vertical direction Dv and a lower half body 312 that is on a lower side of the casing body 31 in the vertical direction Dv, each of which has a semicircular cross section when viewed from an axial direction Da in which the axis O extends, and in the step S2 of manufacturing the metal members M, a plurality of body block portions 318 and 319 which are obtained are formed by forging or steel plate processing, and at least a part of each of the upper half body 311 and the lower half body 312 is formed by combining the plurality of the body block portions 318 and 319 in the axial direction Da.

In this manner, the upper half body 311 and the lower half body 312 are manufactured by being divided into the plurality of body block portions 318 and 319. As a result, each of the body block portions 318 and 319 is downsized, and thereby is easily manufactured and handled. Further, it is also possible to use different metal materials for the body block portions 318 and 319, depending on the parts of the casing body 31.

(4) A manufacturing method S1 of a casing 3 according to a fourth aspect is the manufacturing method S1 of the casing 3 in any one of (1) to (3), in which each of the upper half body 311 and the lower half body 312 has flanges 313 and 314 extending parallel to the axis O, at both end portions in a circumferential direction Dc around the axis O, and in the step S2 of manufacturing the metal members M, the flanges 313 and 314 are formed by forging or steel plate processing.

Thereby, the flanges 313 and 314 can be easily formed with a structure or material having a high strength separately from other portions.

(5) A manufacturing method S1 of a casing 3 according to a fifth aspect is the manufacturing method S1 of the casing 3 in any one of (1) to (4), in which the casing 3 includes tubular members 32, 33, and 34 which have a tubular shape extending from the casing body 31 to an outer side Dro in a radial direction Dr with respect to the axis O, and have flow path portions 323, 334, and 343 that communicate with an inside of the casing body 31, in the tubular members 32, 33, and 34, and in the step S2 of manufacturing the metal members M, the tubular members 32, 33, and 34 are formed by any one of a fused metal deposition method, casting, and steel plate processing.

Examples of the tubular members 32, 33, and 34 include, for example, the inlet valve chamber, the extraction pressure control valve chamber, and the extraction port.

Thereby, the tubular members 32, 33, and 34 which may have a complicated shape as compared with the casing body 31 can be efficiently manufactured by the fused metal deposition method. Further, in a case where the pressure of the fluid flowing in the flow path portion 323 is high, the tubular member 32 is manufactured by the fused metal deposition method or casting, so that the tubular member 32 can be manufactured to have high strength that can withstand a high pressure.

(6) A manufacturing method S1 of a casing 3 according to a sixth aspect is the manufacturing method S1 of the casing 3 in (5), in which the casing body 31 has a communication opening 71 that is open on an outer circumferential surface of the casing body 31 to communicate with the inside, in the step S3 of arranging the plurality of metal members M, end portions 32s, 33s, and 34s of the tubular members 32, 33, and 34 are inserted into the communication opening 71, and in the step S4 of forming the casing 3, outer circumferential surfaces of the tubular members 32, 33, and 34 and an edge portion of the communication opening 71 are welded to each other.

Thereby, the end portions 32s, 33s, and 34s of the tubular members 32, 33, and 34 are inserted into the communication openings 71 formed in the casing 3 and are welded, so that the flow path portions 323, 334, and 343 communicate with the inside of the casing body 31 as they are. Thereby, the tubular members 32, 33, and 34 can be easily connected to the casing body 31.

(7) A manufacturing method S1 of a casing 3 according to a seventh aspect is the manufacturing method S1 of the casing 3 in (5), in which the casing body 31 has a communication opening 71A that is open on an outer circumferential surface 31f of the casing body 31 to communicate with the inside, in the step S3 of arranging the plurality of metal members M, end portions 32s, 33s, and 34s of the tubular members 32, 33, and 34 are brought into contact with the outer circumferential surface 31f of the casing body 31 in a state where the communication opening 71A communicates with the flow path portions 323, 334, and 343, and in the step S4 of forming the casing 3, the outer circumferential surface 31f of the casing body 31 and the end portions 32s, 33s, and 34s of the tubular members 32, 33, and 34 are welded to each other.

Thereby, the tubular members 32, 33, and 34 are arranged only in a region on the outer side Dro of the outer circumferential surface 31f of the casing body 31 in the radial direction Dr. That is, the volumes of the tubular members 32, 33, and 34 are reduced. As a result, the time for manufacturing the tubular members 32, 33, and 34 is shortened, and thus the metal members M can be efficiently manufactured.

(8) A manufacturing method S1 of a casing 3 according to an eighth aspect is the manufacturing method S1 of the casing 3 in (5), in which the casing body 31 includes a casing-side tubular member 91 that protrudes from an outer circumferential surface 31f of the casing body 31 to the outer side Dro in the radial direction Dr and has a casing-side flow path portion 92 communicating with the inside of the casing body 31, in the step S3 of arranging the plurality of metal members M, end portions 32s, 33s, and 34s of the tubular members 32, 33, and 34 are brought into contact with a distal end portion of the casing-side tubular member 91 on the outer side Dro in the radial direction Dr in a state where the casing-side flow path portion 92 communicates with the flow path portions 323, 334, and 343, and in the step S4 of forming the casing 3, the distal end portion of the casing-side tubular member 91 on the outer side and the end portions 32s, 33s, and 34s of the tubular members 32, 33, and 34 are welded to each other.

Thereby, the tubular members 32, 33, and 34 are arranged only in a region further on the outer side Dro of the casing-side tubular member 91 that is positioned on the outer side Dro of the outer circumferential surface 31f of the casing body 31 in the radial direction Dr. That is, the volumes of the tubular members 32, 33, and 34 are considerably reduced. As a result, the time for manufacturing the tubular members 32. 33, and 34 is significantly shortened, and thus the metal members M can be efficiently manufactured.

EXPLANATION OF REFERENCES

1: steam turbine
2: rotor
3: casing
3A: upper half casing
3B: lower half casing
21: rotating shaft
22: rotor blade
23A: first bearing
23B: second bearing
31: casing body
31f: outer circumferential surface
32: inlet valve chamber (tubular member)
32s: end portion
33: extraction pressure control valve chamber (tubular member)
33s: end portion
34: extraction port (tubular member)
34s: end portion
35: steam inlet
36: steam outlet
37: steam intermediate inlet
38: steam intermediate outlet
71, 71A: communication opening
91: casing-side tubular member
92: casing-side flow path portion
311: upper half body
312: lower half body
313: upper flange (flange)
314: lower flange (flange)
315A: upper half diaphragm
315B: lower half diaphragm
317: stator vane
318: upper body block portion (body block portion)
319: lower body block portion (body block portion)
323: inlet flow path portion (flow path portion)
333: inner nozzle
334: extraction pressure control flow path portion (flow path portion)
343: extraction flow path portion (flow path portion)
Da: axial direction
Da1: first side
Da2: second side
Dc: circumferential direction
Dh: horizontal direction
Dr: radial direction
Dri: inner side
Dro: outer side
Dv: vertical direction
M: metal member
O: axis
S1: manufacturing method of casing
S2: step of forming plurality of metal members
S3: step of arranging plurality of metal members
S4: step of forming casing

What is claimed is:

1. A manufacturing method of a casing, the manufacturing method comprising:
a step of manufacturing a plurality of metal members which are components constituting the casing including a casing body having a tubular shape that extends around an axis;
a step of arranging the plurality of metal members according to a shape of the casing to be formed; and
a step of forming the casing by welding the plurality of metal members to each other, wherein
in the step of manufacturing the metal members, the plurality of metal members are manufactured by at least two kinds of manufacturing methods among forging, steel plate processing, casting, and a fused metal deposition method,
the casing is a casing of a steam turbine,
the casing body includes an upper half body that is on an upper side of the casing body in a vertical direction and a lower half body that is on a lower side of the casing body in the vertical direction, each of which has a semicircular cross section when viewed from an axial direction in which the axis extends,
in the step of manufacturing the metal members, a plurality of body block portions which are obtained are formed by bending a flat steel plate by bending processing, or by punching a flat steel plate by pressing processing,
at least a part of each of the upper half body and the lower half body is formed by combining the plurality of the body block portions in the axial direction,
the casing includes a tubular member which has a tubular shape extending from the casing body to an outer side in a radial direction with respect to the axis, and has a flow path portion that communicates with an inside of the casing body, in the tubular member,
the tubular member includes an inlet valve chamber configured to allow highest pressure steam to flow through inside the casing,
in the step of manufacturing the metal members, the tubular member is formed by any one of a fused metal deposition method, casting, and steel plate processing,
the inlet valve chamber is formed as a thickest member in the casing, and
in the step of manufacturing the metal members, the inlet valve chamber is formed by a fused metal deposition method.

2. The manufacturing method of a casing according to claim 1, wherein in the step of manufacturing the metal members, at least one of the metal members is manufactured by the fused metal deposition method.

3. The manufacturing method of a casing according to claim 1, wherein
each of the upper half body and the lower half body has flanges extending parallel to the axis, at both end portions in a circumferential direction around the axis, and
in the step of manufacturing the metal members, the flanges are formed by forging or steel plate processing.

4. The manufacturing method of a casing according to claim 1, wherein
the casing body has a communication opening that is open on an outer circumferential surface of the casing body to communicate with the inside,
in the step of arranging the plurality of metal members, an end portion of the tubular member is inserted into the communication opening, and
in the step of forming the casing, an outer circumferential surface of the tubular member and an edge portion of the communication opening are welded to each other.

5. The manufacturing method of a casing according to claim 1, wherein
the casing body has a communication opening that is open on an outer circumferential surface of the casing body to communicate with the inside,
in the step of arranging the plurality of metal members, an end portion of the tubular member is brought into contact with the outer circumferential surface of the casing body in a state where the communication opening communicates with the flow path portion, and
in the step of forming the casing, the outer circumferential surface of the casing body and the end portion of the tubular member are welded to each other.

6. The manufacturing method of a casing according to claim 1, wherein
the casing body includes a casing-side tubular member that protrudes from an outer circumferential surface of the casing body to the outer side in the radial direction and has a casing-side flow path portion communicating with the inside of the casing body,
in the step of arranging the plurality of metal members, an end portion of the tubular member is brought into contact with a distal end portion of the casing-side tubular member on the outer side in the radial direction in a state where the casing-side flow path portion communicates with the flow path portion, and
in the step of forming the casing, the distal end portion of the casing-side tubular member on the outer side and the end portion of the tubular member are welded to each other.

* * * * *